(12) United States Patent
Beilker et al.

(10) Patent No.: US 11,348,737 B2
(45) Date of Patent: May 31, 2022

(54) PLATE CAPACITOR HAVING A PLATE MADE OF AN ELASTIC MATERIAL

(71) Applicant: Continental Automotive GmbH, Hannover (DE)

(72) Inventors: Dirk Beilker, Frankfurt (DE); Fabian Sommer, Seligenstadt (DE)

(73) Assignee: Continental Automotive GmbH

( * ) Notice: Subject to any disclaimer, the term of this patent is extended or adjusted under 35 U.S.C. 154(b) by 0 days.

(21) Appl. No.: 16/825,875

(22) Filed: Mar. 20, 2020

(65) Prior Publication Data

US 2020/0219658 A1    Jul. 9, 2020

Related U.S. Application Data

(63) Continuation of application No. PCT/EP2018/074595, filed on Sep. 12, 2018.

(30) Foreign Application Priority Data

Sep. 21, 2017  (DE) .................... 10 2017 216 772.6

(51) Int. Cl.
*H01G 5/16*    (2006.01)
*H01G 5/011*   (2006.01)
*H01G 5/18*    (2006.01)

(52) U.S. Cl.
CPC .............. *H01G 5/16* (2013.01); *H01G 5/011* (2013.01); *H01G 5/18* (2013.01)

(58) Field of Classification Search
CPC ....................................................... H01G 5/16
See application file for complete search history.

(56) References Cited

U.S. PATENT DOCUMENTS

| 1,871,048 | A | * | 8/1932 | Dubilier ..................... 361/724 |
| 3,693,059 | A | | 9/1972 | Harris et al. |
| 3,993,939 | A | | 11/1976 | Slavin et al. |
| 4,016,466 | A | | 4/1977 | Frappart |
| 2007/0039147 | A1 | | 2/2007 | Shimanouchi et al. |
| 2008/0180092 | A1 | | 7/2008 | Fukushima et al. |

FOREIGN PATENT DOCUMENTS

| CN | 1815646 A | 8/2006 |
| CN | 200950090 Y | 9/2007 |
| CN | 102192760 A | 9/2011 |
| CN | 105829997 A | 8/2016 |
| DE | 2513785 A1 | 10/1975 |
| KR | 20150009235 A | 1/2015 |

OTHER PUBLICATIONS

Office Action dated Aug. 7, 2018 from corresponding German Patent Application No. DE 10 2017 216 772.6.
International Search Report and Written Opinion dated Dec. 17, 2018 from corresponding International Patent Application No. PCT/EP2018/074595.
Chinese First Office Action dated Mar. 30, 2021 for the counterpart Chinese Patent Application No. 201880060813.6.

* cited by examiner

*Primary Examiner* — Eric W Thomas

(57) ABSTRACT

A plate capacitor having a first capacitor plate which is arranged at a distance from a second capacitor plate. The first capacitor plate is produced from an elastic material and has a curved shape in the unloaded state. The first capacitor plate is held by a holder. The elastic material to be is electrically conductive or is provided with an electrically conductive layer. An electrically insulating layer is arranged between the first and the second capacitor plate.

8 Claims, 2 Drawing Sheets

PLATE CAPACITOR HAVING A PLATE MADE OF AN ELASTIC MATERIAL

CROSS-REFERENCE TO RELATED APPLICATIONS

This U.S. patent application claims the benefit of PCT patent application No. PCT/DE2018/074595, filed Sep. 12, 2018, which claims the benefit of German patent application No. 10 2017 216 772.6, filed Sep. 21, 2017, both of which are hereby incorporated by reference.

TECHNICAL FIELD

The invention relates to a plate capacitor.

BACKGROUND

The prior art discloses plate capacitors which have two electrically conductive capacitor plates which are located at a distance from one another.

Plate capacitors of this kind are also used for measurement purposes by way of the change in the capacitance of the plate capacitor as the distance of the capacitor plates from one another changes being used, by way of measuring the capacitance of the plate capacitors, to draw conclusions about the distance of the capacitor plates from one another.

The plate capacitors used to date have rigid capacitor plates and may, therefore, be of limited use for travel measurements in some cases.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Therefore, a plate capacitor which is of simple construction and can be used for travel measurements is provided. This is achieved by a plate capacitor comprising a first capacitor plate which is arranged at a distance from a second capacitor plate. The first capacitor plate is produced from an elastic material, has a curved shape in the unloaded state and is held by a holder. The elastic material is electrically conductive or is provided with an electrically conductive layer.

Furthermore, an electrically insulating layer is arranged between the first and the second capacitor plate. The elastic capacitor plate bears against the second capacitor plate only by way of the electrically insulating layer in the unloaded state. As a result, only a punctiform region (in the case of a partially spherical capacitor plate) or a linear region (in the case of a curved capacitor plate) is at the shortest distance of the first capacitor plate from the second capacitor plate. Thus, having a great influence on the capacitance of the plate capacitor, while the other regions of the first capacitor plate are further away owing to their curvature. Therefore, the air which is then situated between them as dielectric has less influence on the capacitance of the plate capacitor overall.

The above-mentioned position may be the position which has the greatest distance between the capacitor plates. Due to the fact that, further distance would not provide a good degree of accuracy for measurement purposes, as the capacitance of the plate capacitor would only slightly change as the distance between the capacitor plates increases due to the air which is present as dielectric.

However, if the position when the first capacitor plate just touches the insulating layer is selected as the greatest distance of the two capacitor plates from one another, the effective surface area of the first capacitor plate then becomes increasingly larger as the distance reduces, so that a good degree of accuracy of the measurement values can be achieved.

In the case of a partially circular configuration of the first capacitor plate, said first capacitor plate deforms as the distance of the holder from the second capacitor plate reduces, and the portion of the first capacitor plate which rests on the insulating layer becomes increasingly larger. The section surface of a circle is approximately taken to be the resting part of the first capacitor plate. This surface grows proportionally in relation to the reduction in the distance of the holder from the second capacitor plate, until the first capacitor plate rests fully on the insulating layer. Since the distance between the second printed circuit board and the portions of the first printed circuit board which rest on the electrical insulation now remains the same, the capacitance is linearly dependent on the resting surface of the first capacitor plate.

The configuration of the curved shape as a partially spherical shape ensures that the deformation of the curved shape as the first capacitor plate approaches the second capacitor plate leads to flat resting without distortions, so that reproducible measurement results are obtained.

In the case of configuration of the first capacitor plate from conductive rubber, a permanent function of the first printed circuit board is obtained.

When the first capacitor plate merges with a transition region by means of which the first capacitor plate is held, the first capacitor plate can be held effectively.

This can be implemented by way of the transition region being clamped over the holder and/or adhesively bonded to the holder. Clamping can be implemented in a simple manner when the transition region surrounds parts of the holder. The transition region can also be fixed in the holder or adhesively bonded to the holder.

When the transition region has a hollow-cylindrical shape and the holder has a cylindrical shape, the hollow-cylindrical shape of the transition region can be pulled over the cylindrical part and clamped in this way, for example when the inside diameter of the hollow cylinder is somewhat smaller than the outside diameter of the cylinder.

When the holder consists of metal or is provided with a metal coating, the first capacitor plate can be electrically connected in the case of a configuration of the first capacitor plate from conductive rubber or a metal coating.

When the second capacitor plate is arranged on a printed circuit board, it can be produced by way of being produced in one work cycle with the conductors from the conductor material of the conductors of the printed circuit board during production of the printed circuit board by means of conventional production techniques for printed circuit boards. The second capacitor plate can also be produced by a separate electrically conductive plate which is arranged on a printed circuit board or in some other way.

When the plate capacitor has a sleeve which extends from the end of the curved shape or from the transition region to the printed circuit board, the plate capacitor can be protected against environmental influences.

When the electrically insulating layer is arranged on the second capacitor plate, a permanent configuration is selected since the layer is not mechanically moved. In principle, a configuration of the electrically insulating layer on the first capacitor plate adjacent to the second capacitor plate is also possible.

The plate capacitor can be used as part of an apparatus for distance measurement or pressure measurement.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
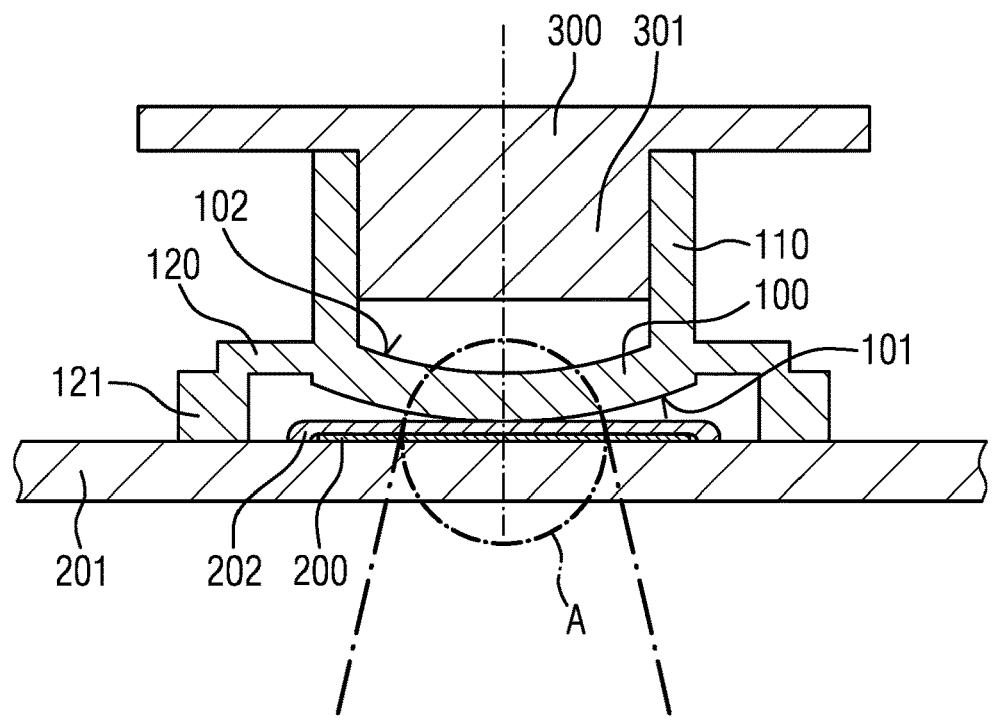
FIG. 1 shows a section through a exemplary embodiment in a first end position.

FIG. 1 shows a first capacitor plate 100 with a first surface 101 and a second surface 102, a second capacitor plate 200 which is arranged on a printed circuit board 201 and is coated with an electrically insulating layer 202, and a holder 300.

The first capacitor plate 100 has a partially spherical shape and merges with a transition region 110. Furthermore, a sleeve 120 is integrally formed with the first capacitor plate 100, which sleeve extends from the transition region 110 to the printed circuit board 201 and thereby prevents dirt or moisture from being able to enter between the two capacitor plates 100, 200 and therefore the functioning of the plate capacitor is not adversely affected.

The transition region 110 is of hollow-cylindrical configuration and is fitted over a cylindrical part 301 of the holder 300, wherein the inside diameter of the transition region 110 is somewhat smaller than the diameter of the cylindrical part 301 in the non-fitted state. Therefore, the transition region 110 is clamped over the cylindrical part 301 in the fitted state illustrated in FIG. 1.

A permanent connection between the holder 300 can also be made by other known connection techniques, such as adhesive bonding or fixing for example. Instead of the cylindrical shape, a cuboid or partially spherical configuration can also be selected for example.

The second capacitor plate 200 is produced from the material of which conductor tracks, not illustrated either, of the printed circuit board 201 also consist. Therefore, they can be produced at the same time as the printed circuit board. It is also possible to produce the second capacitor plate 200 in a different way.

The electrically insulating layer 202 used can be a solder resist and therefore the production can be further simplified since this solder resist is applied at the latest before fitting other electrical or electronic components on the printed circuit board 201.

In principle, it is also possible to apply the insulating layer to the first surface 101 of the first capacitor plate 100. Owing to the continuous deformation of the first capacitor plate 100, application of the insulating layer to the second capacitor plate 200 appears to be the more permanent solution.

The holder 300 may be, together with the cylindrical part 301, produced from metal since, in the case of a configuration of the first capacitor plate 100 from conductive rubber, the first capacitor plate 100 is then electrically conductively connected to the holder 300. Therefore, the first capacitor plate can be readily electrically connected to an evaluation electronics system, not illustrated, wherein the evaluation electronics system can be fitted on the printed circuit board 201 and therefore can also be connected to the second capacitor plate 200 in a simple manner.

The first capacitor plate 100 can also be produced by an electrically non-conductive elastic material which can be fully or partially provided with a metal coating which then takes on the function of the first printed circuit board. If this metal coating were made on the second (inner) side 102, the component 100, illustrated in FIG. 1, would have the function of an insulating layer. Therefore, the additional electrically insulating layer 202 could then be dispensed with. The metal coating could be configured, for example, in a meandering manner in order to increase the durability of the connection between the coating and the electrical component.

The sleeve 120 may have a foot 121 in the region of the printed circuit board 201, which foot is of annular configuration and rests on the printed circuit board 201.

Figure 2:
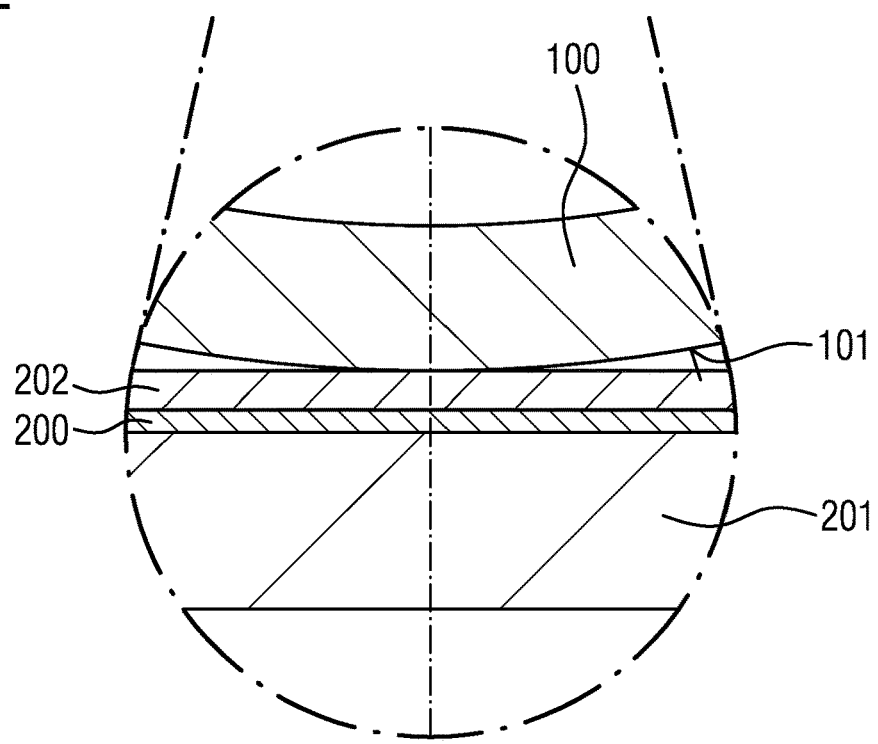
FIG. 2 shows the detail A from FIG. 1.

FIG. 2 shows that the first capacitor plate 100 just touches the electrically insulating layer 202 and still has the partially spherical shape.

Figure 3:
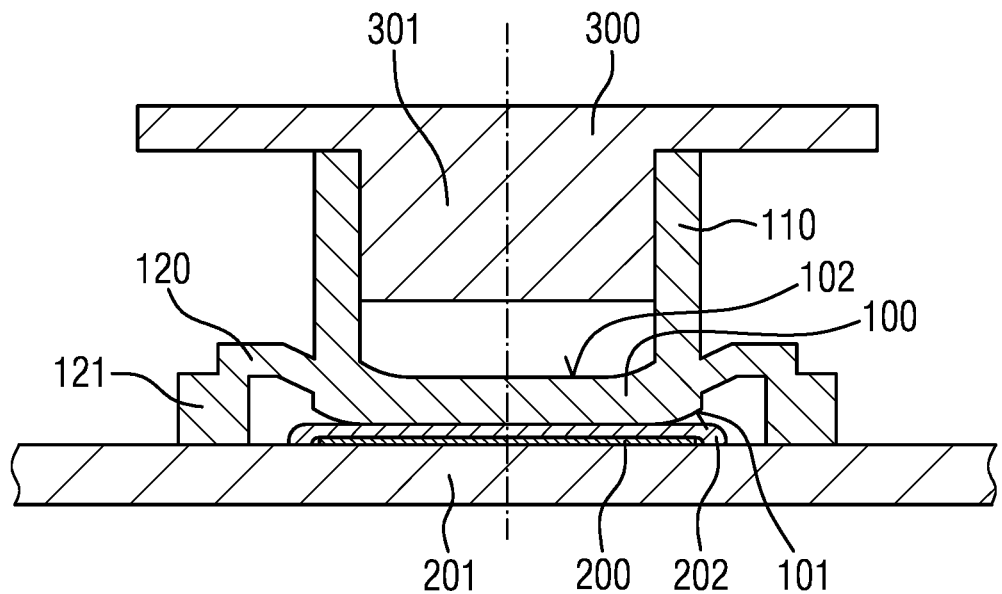
FIG. 3 shows the section through the exemplary embodiment from FIG. 1 in an intermediate position.

In FIG. 3, the holder 300 is moved closer to the second printed circuit board 201 in comparison to the first end position illustrated in FIGS. 1 and 2. Therefore, the first capacitor plate 100 is partially pushed in and rests partially on the electrically insulating layer 202 in a flat manner, while only the outer region of the first capacitor plate 100 still has a curvature. The sleeve 120 is correspondingly deformed and the foot 121 of the sleeve 120 rests on the printed circuit board 201.

Figure 4:
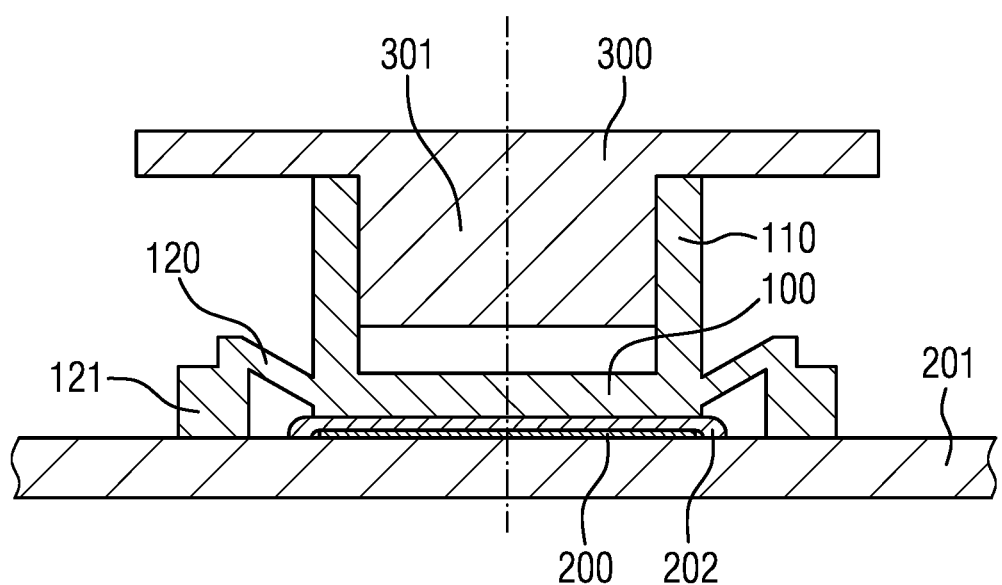
FIG. 4 shows the section through the exemplary embodiment from FIGS. 1 and 3 in a second end position.

FIG. 4 illustrates the holder 300 in its second end position, and therefore the first printed circuit board 100, by way of its first surface 101, rests fully on the insulating layer 202. Therefore, the capacitance of the plate capacitor with the printed circuit boards 100, 200 is at the greater amount. It is possible to establish that the capacitance changes linearly with the distance of the holder from the printed circuit board. By accurately measuring the capacitance which is present at specific positions and storing the measurements in a table, the accuracy of the distance measurement can be further increased when the corresponding distances which are assigned in the table are assigned to the measured capacitance values. For values which lie between the stored capacitances, the distance values can be determined by interpolation.

In FIG. 4, the holder 300 is in its second end position. The first plate capacitor 100 rests, by way of its first surface 101, fully on the electrically insulating layer 202, and therefore the capacitance of the plate capacitor is at the greatest amount.

The foot 121 of the sleeve 120 further rests on the printed circuit board.

In the present description, the holder 300 and the printed circuit board 201 have been used as reference variables since they describe the change in position of a travel measurement most clearly in the present exemplary embodiment. It would also be possible, for example, to use the distance of the second capacitor plate and an elastically inflexible part of the first capacitor plate or of the transition region.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A plate capacitor comprising:
    a first capacitor plate produced from an elastic material and has a curved shape in an unloaded state
    a second capacitor plate arranged at a distance from the first capacitor plate;
    a holder to retain the first capacitor plate;
    an electrically insulating layer is arranged between the first and the second capacitor plate;
    wherein the elastic material is one of: electrically conductive and provided with an electrically conductive layer;
    wherein a transition region has a hollow-cylindrical shape and wherein the holder has a cylindrical part; and
    wherein the first capacitor plate merges with the transition region by which the first capacitor plate is held and wherein the transition region is one of: clamped over the holder and adhesively bonded to the holder.

2. The plate capacitor as claimed in claim 1, wherein the curved shape has a partially spherical shape.

3. The plate capacitor as claimed in claim 1, wherein the electrically conductive material is conductive rubber.

4. The plate capacitor as claimed in claim 1, wherein the holder is one of: consisting of metal and provided with a metal coating.

5. The plate capacitor as claimed in claim 1, wherein the second capacitor plate is arranged on a printed circuit board.

6. The plate capacitor as claimed in claim 5, wherein the second capacitor plate has a sleeve which extends from one of: the end of the curved shape and from the transition region to the printed circuit board.

7. The plate capacitor as claimed in claim 1, wherein the electrically insulating layer is arranged on the second capacitor plate.

8. An apparatus for distance measurement comprising:
    a first capacitor plate produced from an elastic material and has a curved shape in an unloaded state a second capacitor plate arranged at a distance from the first capacitor plate;
    a holder to retain the first capacitor plate;
    an electrically insulating layer is arranged between the first and the second capacitor plate;
    wherein the elastic material is one of: electrically conductive and provided with an electrically conductive layer;
    wherein a transition region has a hollow-cylindrical shape and wherein the holder has a cylindrical part; and
    wherein the first capacitor plate merges with the transition region by which the first capacitor plate is held and wherein the transition region is one of: clamped over the holder and adhesively bonded to the holder.

* * * * *